(12) United States Patent
Imura et al.

(10) Patent No.: US 7,514,896 B2
(45) Date of Patent: Apr. 7, 2009

(54) METHOD OF ESTIMATING MAGNETIC POLE POSITION IN SYNCHRONOUS MOTOR

(75) Inventors: Akihiro Imura, Oobu (JP); Yasuaki Aoki, Kariya (JP)

(73) Assignee: Denso Corporation, Kariya (JP)

( * ) Notice: Subject to any disclaimer, the term of this patent is extended or adjusted under 35 U.S.C. 154(b) by 212 days.

(21) Appl. No.: 11/505,466

(22) Filed: Aug. 17, 2006

(65) Prior Publication Data
US 2007/0069681 A1  Mar. 29, 2007

(30) Foreign Application Priority Data
Sep. 27, 2005  (JP) ............... 2005-280410

(51) Int. Cl.
*H02P 1/46* (2006.01)
(52) U.S. Cl. .................... 318/718; 318/400.2; 318/700; 318/773
(58) Field of Classification Search .............. 318/718, 318/400.2, 700, 400.02, 773, 779, 798, 432, 318/434, 727, 799, 806, 721
See application file for complete search history.

(56) References Cited

U.S. PATENT DOCUMENTS

| 6,396,229 | B1 | 5/2002 | Sakamoto et al. | |
| 2006/0049787 | A1* | 3/2006 | Ode et al. | 318/432 |
| 2008/0072619 | A1* | 3/2008 | Nojima et al. | 62/498 |

FOREIGN PATENT DOCUMENTS

| JP | A 2000-217385 | 8/2000 |
| JP | B2 3411878 | 9/2001 |
| JP | A 2003-199390 | 7/2003 |

OTHER PUBLICATIONS

Morimoto, S. et al., "Sensorless control strategy for salient-pole PMSM based on extended EMF in rotating reference frame" IEEE Transactions on Industry Applications, vol. 38, Issue 4, Jul.-Aug. 2002, pp. 1054-1061.
Zhiqian Chen et al. "An Extended E.m.f. Observer for Salient-Pole Brushless DC Motor's Sensorless Control"; The National Meeting in 1999, The Institute of Electrical Engineer of Japan (IEEJ0), No. 1026; pp. 4-480~4-481(discussed on p. 3 in the spec.).

* cited by examiner

*Primary Examiner*—Karen Masih
(74) *Attorney, Agent, or Firm*—Oliff & Berridge, PLC

(57) ABSTRACT

In a method of estimating a magnetic pole position in a synchronous motor, an alternating current voltage having $\alpha$- and $\beta$-axes components in an $\alpha\beta$ coordinates system representing a two-phase alternating current coordinates system is applied to the motor, and $\alpha$- and $\beta$-axes components of an alternating current are detected from the motor. A wave height of the alternating current changing with time is approximated to a wave height not depending on time, so that a differentiated value of the wave height with respect to time is substantially set at zero. An induced voltage of the motor is calculated from the components of the alternating current voltage and the components of the alternating current. The magnetic pole position is estimated from the induced voltage.

29 Claims, 13 Drawing Sheets

METHOD OF ESTIMATING MAGNETIC POLE POSITION IN SYNCHRONOUS MOTOR

CROSS-REFERENCE TO RELATED APPLICATION

This application is based upon and claims the benefit of priority of the prior Japanese Patent Application 2005-280410 filed on Sep. 27, 2005 so that the contents of which are incorporated herein by reference.

BACKGROUND OF THE INVENTION

1. Field of the Invention

The present invention relates to a method of estimating a position (e.g., magnetic pole position) of a rotor in a synchronous motor wherein permanent magnets are used for the rotor.

2. Description of Related Art

In a synchronous motor such as a surface permanent magnetic synchronous motor (SPMSM) or an internal permanent magnetic synchronous motor (IPMSM), permanent magnets are used for a rotor, and S and N magnetic poles formed by the permanent magnets are alternately disposed around a shaft of the rotor. During the operation of this motor, an alternating current voltage is applied to windings of a stator, and an alternating current generated from the applied voltage flows through the windings. A phase of the voltage is controlled in synchronization with a position (e.g., magnetic pole position) of a rotor. Therefore, a position detector for detecting the magnetic pole position of the rotor is required. As this detector, a Hall element, an encoder or a resolver is used. However, it is difficult to downsize a motor with a position detector, and it is required to connect the detector with a controller for controlling the motor through connection lines.

Therefore, to control a synchronous motor without using any position detector, a magnetic pole position of a rotor in a motor has recently been estimated by using an induced voltage of the motor. During the operation of the motor, the motor itself induces a voltage changed with the magnetic pole position. Therefore, the magnetic pole position can be estimated from the induced voltage. For example, Published Japanese Patent First Publication No. 2001-251889 discloses a motor model approximated on a dq rotational coordinates system having a d-axis and a q-axis to estimate a magnetic pole position based on an induced voltage. The d-axis is set so as to be directed from an S magnetic pole to an N magnetic pole in a rotor. The q-axis is set to be orthogonal to the d-axis on a plane perpendicular to a rotation axis of the rotor. An original point of the coordinates system is placed on the rotation axis.

In the estimation based on this motor model, a shaft shift $\Delta\theta$ of an estimated pole position from a true pole position (i.e., d-axis) in a synchronous motor is calculated from a component Idc (hereinafter, called d-axis component) of a detected direct current along the d-axis, a component Iqc (hereinafter, called q-axis component) of the detected direct current along the q-axis, a d-axis component V*d of a voltage applied to the motor, a q-axis component V*q of the applied voltage and an instructed rotational speed $\omega$*r of the rotor. An estimated magnetic pole position of the rotor is calculated from the shift $\Delta\theta$.

However, in an actual motor, an alternating current voltage of three phases is applied to windings of a stator of a motor, and a three-phase alternating current flowing through the windings of the stator is detected. To obtain the components Idc and Iqc of the direct current expressed on the d-q rotational coordinates system, it is required to transform three-dimensional coordinates system for the actually detected alternating current into two-dimensional rotational coordinates system, based on an estimated magnetic pole position. In this case, the components Idc and Iqc include error derived from position error in the estimation of the position. Because a next magnetic pole position is estimated based on the components Idc and Iqc including error, precision of the estimation is inevitably lowered. As a result, when the motor is controlled according to the estimated position, the motor cannot stably be operated.

To solve this problem, direct estimation of a magnetic pole position based on a motor model using an extended induced voltage has been proposed in a paper of "An Extended E.m.f Observer for Salient-Pole Brushless DC Motor's Sensorless Control" in the national meeting in 1999, the Institute of Electrical Engineer of Japan (IEEJ), No. 1026.

In this paper, a magnetic field observer is constituted based on the model defined on an $\alpha\beta$ stationary coordinates system representing a two-phase alternating current coordinates system. Each of an alternating current voltage applied to a synchronous motor and an alternating current detected from the motor is expressed by a vector having two components along $\alpha$- and $\beta$-axes of the $\alpha\beta$ coordinates system. When giving, to the observer, $\alpha$- and $\beta$-axes components of the applied alternating current voltage and $\alpha$- and $\beta$-axes components of the detected alternating current, a magnetic pole position can be directly estimated. This position is expressed as an angle between the $\alpha$-axis and a line connecting an original point and a magnetic pole of a rotor in the $\alpha\beta$ coordinates system.

In this paper, precision of the estimation of a magnetic pole position can be improved by the motor model using the alternating current voltage and the alternating current defined on the two-phase alternating current coordinates system. However, because the model includes a differential term to calculate an induced voltage in detail, an amount of calculation required for the estimation is enormously increased.

SUMMARY OF THE INVENTION

An object of the present invention is to provide, with due consideration to the drawbacks of the conventional estimation of a magnetic pole position, a method wherein a magnetic pole position of a rotor in a synchronous motor is correctly estimated while reducing an amount of calculation required for the estimation without substantially lowering precision in the estimation.

According to an aspect of this invention, the object is achieved by the provision of a method of estimating a magnetic pole position in a synchronous motor, comprises the steps of (1) calculating an induced voltage of the motor, to which an alternating current voltage is applied and from which an alternating current is detected, from components of the applied alternating current voltage in a two-phase alternating current coordinates system and components of the detected alternating current in the two-phase alternating current coordinates system, and (2) estimating a magnetic pole position of the rotor from the induced voltage. A differentiated value of a wave height of the alternating current with respect to time is substantially set at zero.

Although a wave height of the alternating current is slightly changed with time, this wave height is approximated to or replaced with a wave height substantially not depending on time. In this case, differential terms in the calculation of the induced voltage from the applied alternating current voltage and the detected alternating current can be removed. Therefore, an amount of calculation required for the estimation can be considerably reduced, and precision in the estimation is not substantially lowered.

As compared with an induced voltage model constituted on the dq rotational coordinates system, precision in the estimation can be heightened.

DETAILED DESCRIPTION OF THE PREFERRED EMBODIMENTS

Embodiments of the present invention will now be described with reference to the accompanying drawings.

Embodiment 1

Figure 1:
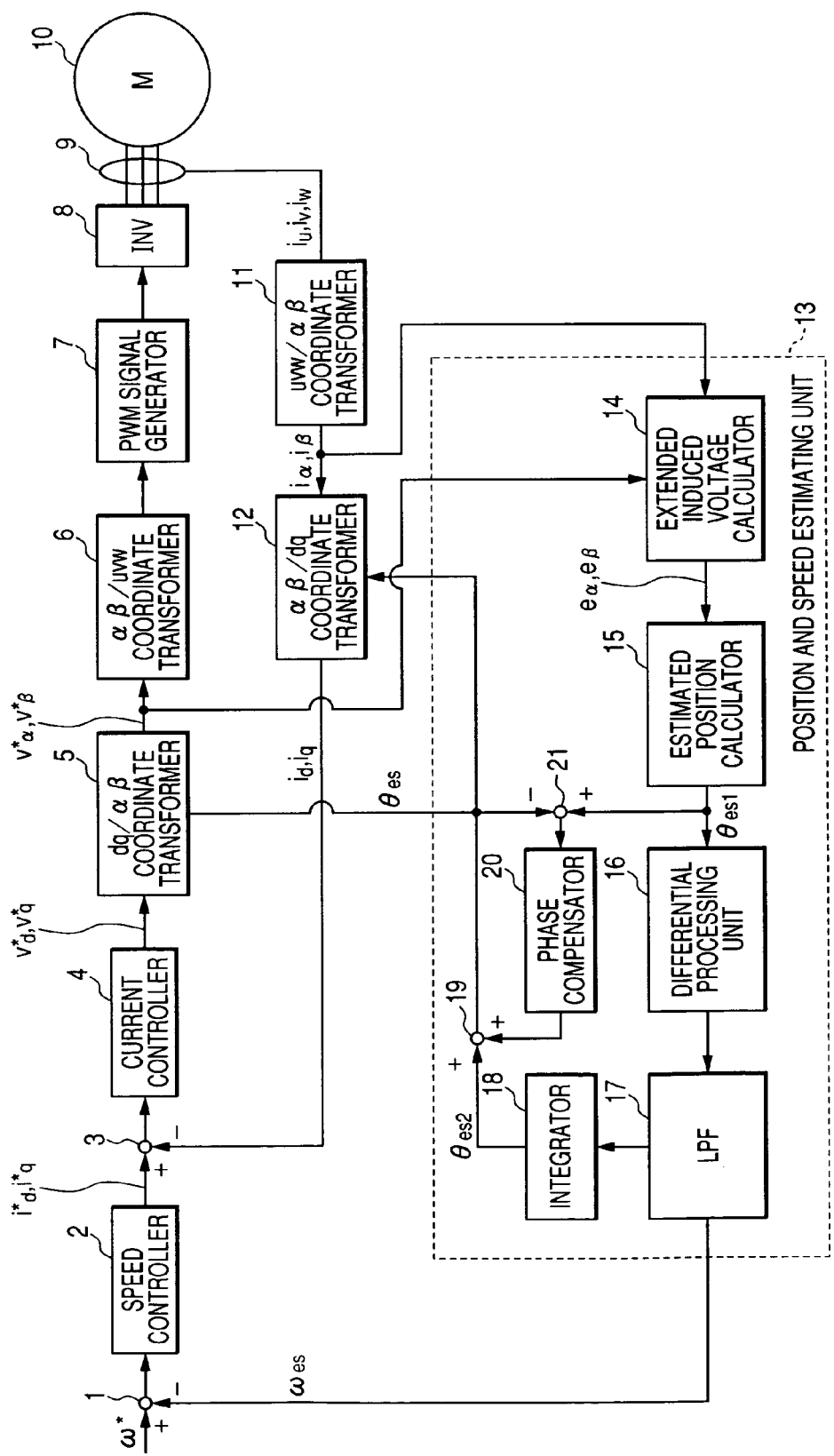
FIG. 1 is a block diagram of a control unit for a synchronous motor wherein a method according to a first embodiment of the present invention is performed.
Figure 2:
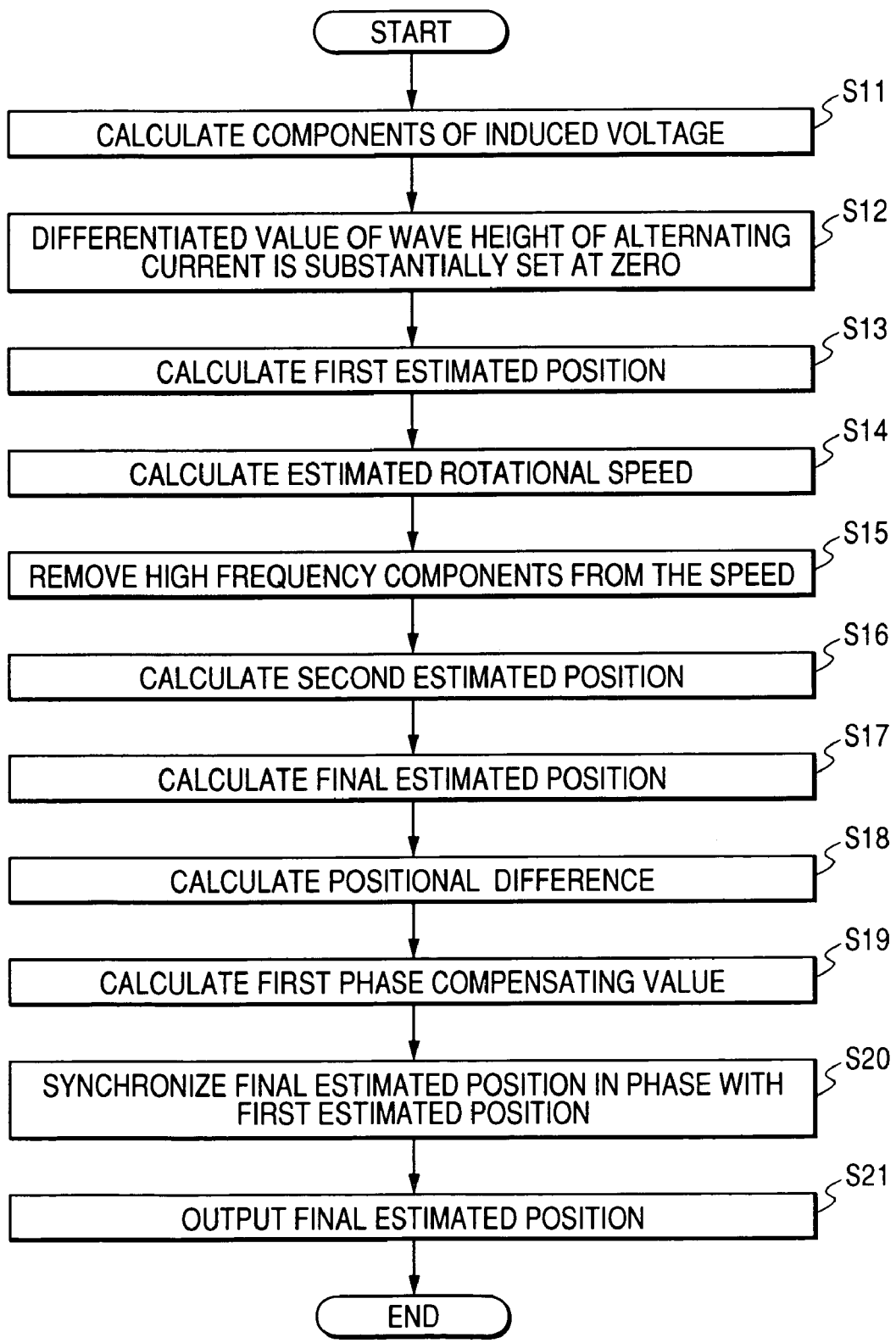
FIG. 2 is a flow chart showing the procedure of a method of estimating a magnetic pole position according to the first embodiment.

FIG. 1 is a block diagram of a control unit for a synchronous motor wherein a method according to a first embodiment of the present invention is performed. FIG. 2 is a flow chart showing the procedure of a method of estimating a magnetic pole position according to the first embodiment.

A synchronous motor 10 shown in FIG. 1 has windings of a stator and a rotor (not shown) made of permanent magnets.

When a three-phase alternating current voltage is applied to the windings, a three-phase alternating current composed of phase currents of U, V and W phases flows through the windings so as to generate a changeable magnetic field due to electromagnetic induction, and the rotor having the permanent magnets is rotated on its rotation axis in response to the magnetic field. The rotational force is outputted through a transmitter such as a pulley and a belt.

A phase of the current is controlled in a control unit shown in FIG. 1 to stably rotate the rotor at a desired rotational speed.

As shown in FIG. 1, data of an instructed (or desired) rotational speed $\omega^*$ of the rotor (i.e., speed of a magnetic pole) is repeatedly given to the control unit. Each time data of the speed $\omega^*$ is given to the control unit, a first difference calculator 1 calculates a difference between the speed $\omega^*$ and an estimated rotational speed $\omega_{es}$ of the rotor. A speed controller 2 calculates values of both a d-axis component $i_d^*$ and a q-axis component $i_q^*$ of an instructed alternating current $i_{ac}^*$ defined in a dq rotational coordinates system from the difference $\omega^* - \omega_{es}$ such that the estimated rotational speed $\omega_{es}$ approaches the instructed rotational speed $\omega^*$. As described later, the speed $\omega_{es}$ is derived from the components $i_d^*$ and $i_q^*$.

In the dq rotational coordinates system, the d-axis is directed from an observed S magnetic pole to a corresponding N magnetic pole of the rotor, the q-axis is orthogonal to the d-axis on a plane perpendicular to a rotation axis of the rotor, and an original point is set at a position on the rotation axis. Therefore, a true magnetic pole position is placed on the d-axis.

A second difference calculator 3 calculates a d-axis difference $\Delta i_d$ between the d-axis component $i^*_d$ and a d-axis component $i_d$ of a detected current and calculates a q-axis difference $\Delta i_q$ between the q-axis component $i^*_q$ and a q-axis component $i_q$ of the detected current. The current is detected from stator windings of a motor 10. A current controller 4 calculates values of both a d-axis component $V^*_d$ of an instructed voltage and a q-axis component $V^*_q$ of the instructed voltage from the differences $\Delta i_d$ and $\Delta i_q$ such that each of the differences $\Delta i_d$ and $\Delta i_q$ approaches zero.

A dq/$\alpha\beta$ coordinate transformer 5 transforms the dq rotational coordinates system into an $\alpha\beta$ coordinates system, based on a final estimated magnetic pole position $\theta_{es}$ of the rotor, to convert the components $V^*_d$ and $V^*_q$ of the instructed voltage into an $\alpha$-axis component $V^*_\alpha$ and a $\beta$-axis component $V^*_\beta$ of the instructed voltage defined in the $\alpha\beta$ coordinates system. The position $\theta_{es}$ is expressed by a rotational angle of the rotor.

As is well-known, the $\alpha\beta$ coordinates system is a stationary system and is defined by an $\alpha$-axis and a $\beta$-axis orthogonal to each other on a plane perpendicular to the rotation axis of the rotor, and its original point is set on the rotation axis of the rotor to be the same as that of the dq coordinates system. Because the $\alpha\beta$ coordinates system is a stationary system, voltage and current are, respectively, expressed by an alternating current signal and an alternating current voltage signal on the αβ coordinates system. Therefore, the αβ coordinates system represents a two-phase alternating current coordinates system.

When a magnetic pole position of the rotor is correctly estimated so as to coincide with the true position, a relative relation in phase (i.e., an angle between the α-axis and the d-axis) between the αβ stationary coordinates system and the dq rotational coordinates system can be specified based on the correctly estimated position.

Therefore, the coordinate transformation can be correctly performed based on the estimated position $\theta_{es}$.

An αβ/uvw coordinate transformer 6 transforms the αβ coordinates system into a UVW coordinates system defined by a U-phase axis, a V-phase axis and a W-phase axis to convert the components $V^*_\alpha$ and $V^*_\beta$ of the instructed voltage into a U-phase component V*u, a V-phase component V*v and a W-phase component V*w. The three axes of the UVW coordinates system are spaced at equal intervals of 120 degrees in electrical angle and correspond to U, V and W phases, and an original point of the UVW coordinates system is set at the same position of that of the αβ coordinates system.

A pulse width modulation (PWM) signal generator 7 generates a PWM signal from each of the components V*u, V*v and V*w. The PWM signals are, respectively, transmitted to an inverter 8 to operate three switching elements corresponding to the stator windings. Therefore, an alternating current voltage having the components V*u, V*v and V*w is applied to the windings. In response to the applied voltage, a three-phase alternating current having a U-phase component $i_U$, a V-phase component iv and a W-phase component $i_W$ flows through the windings. Further, the motor 10 itself generates an induced voltage depending on a magnetic pole position. Therefore, the alternating current depends on the applied voltage and the induced voltage.

A current sensor 9 detects values of the components $i_U$, $i_V$ and $i_W$ of the alternating current. The sensor 9 may detect only two of the three component values to calculate the other component value from the detected values. A uvw/αβ coordinate transformer 11 transforms the UVW coordinates system into the αβ coordinates system and converts the components $i_U$, $i_V$ and $i_W$ of the detected alternating current to an α-axis component $i_\alpha$ and a i-axis component $i_\beta$ of the detected alternating current.

The components $i_\alpha$ and $i_\beta$ are received in an αβ/dq coordinate transformer 12 and a position and speed estimating unit 13. The transformer 12 transforms the αβ coordinates system into the dq coordinates system, based on a final estimated magnetic pole position $\theta_{es}$ outputted from the estimating unit 13, to convert the component $i_\alpha$ and $i_\beta$ of the detected alternating current to the d-axis component $i_d$ and the q-axis component $i_q$ of the detected current. The components $i_d$ and $i_q$ of the detected current are transmitted to the calculator 3.

Estimation of position and speed of a magnetic pole (or a rotor) performed in the unit 13 is described with reference to FIG. 2.

An extended induced voltage calculator 14 of the unit 13 calculates values of an α-axis component $e_\alpha$ and a β-axis component $e_\beta$ of the induced voltage from values of the components $V^*_\alpha$ and $V^*_\beta$ of the instructed voltage and values of the components $i_\alpha$ and $i_\beta$ of the detected current (step S11). This calculation is performed based on an approximate induced voltage model which is obtained as approximation of an extended induced voltage model. The extended induced voltage model according to the prior art is expressed in the αβ coordinates system according to a first formula:

$$\begin{bmatrix} V_\alpha \\ V_\beta \end{bmatrix} = \begin{bmatrix} R+pL_d & \omega_{re}(L_d-L_q) \\ -\omega_{re}(L_d-L_q) & R+pL_d \end{bmatrix} \begin{bmatrix} i_\alpha \\ i_\beta \end{bmatrix} +$$
$$\{(L_d-L_q)(\omega_{re}i_d-i_q)+\omega_{re}K_E\}\begin{bmatrix} -\sin\theta_{re} \\ \cos\theta_{re} \end{bmatrix}$$

by using both an α-axis component $V_\alpha$ and a β-axis component $V_\beta$ of an instructed voltage applied to a motor, a resistance R of a stator, a rotational speed $\omega_{re}$ of a rotor in electrical angle obtained by differentiating a position of the rotor estimated in a previous estimation cycle with respect to time, a d-axis inductance $L_d$ in the motor, a q-axis inductance $L_q$ in the motor, a differential operator p, both an α-axis component $i_\alpha$ and a β-axis component $i_\beta$ of a current detected from the motor, and a constant $K_E$ of an induced voltage.

In this formula, the second term of the right side is defined as an extended induced voltage. In this model, in addition to an induced voltage based on permanent magnets of the rotor, an inductance difference $L_d - L_q$ generating a reluctance torque is considered as a component of an additional magnetic flux. When a magnetic field observer is constituted based on this model, both an α-axis component $e_\alpha$ and β-axis component $e_\beta$ of an extended induced voltage can be directly calculated according to a second formula:

$$\begin{bmatrix} e_\alpha \\ e_\beta \end{bmatrix} = \frac{s}{s+\alpha}\left\{\begin{bmatrix} V_\alpha \\ V_\beta \end{bmatrix} - \begin{bmatrix} R+pL_d & \omega_{re}(L_d-L_q) \\ -\omega_{re}(L_d-L_q) & R+pL_d \end{bmatrix}\begin{bmatrix} i_\alpha \\ i_\beta \end{bmatrix}\right\}$$

by additionally using a differential operator s and an observer pole α.

Because this model includes a differential term s/(s+α), an amount of calculation required for the estimation is enormously increased. To reduce the amount of calculation in this embodiment, an approximate induced voltage model not including any differential term is used for estimation of a magnetic pole position, in place of the extended induced voltage model.

More specifically, a wave height Ia(t) of both the α-axis component $i_\alpha$ ($i_\alpha = -Ia(t)\cdot\sin\theta$, $\theta = \omega_{re}t + c$, c is a constant) and the β-axis component $i_\beta$ ($i_\beta = Ia(t)\cdot\cos\theta$) in the detected current is changed with time. This time depending wave height Ia(t) is approximated to or replaced with a wave height Ia substantially not depending on time t ($d/dt\cdot Ia \approx 0$). That is, a differentiated value of a wave height of the alternating current with respect to time is substantially set at zero (step S12). In this case, a differential term for the α-axis component $i_\alpha$ in the extended induced voltage model can be rewritten according to a third formula.

$$pL_d \cdot i_\alpha = L_d \frac{d}{dt} \cdot i_\alpha$$
$$= L_d\left(-\frac{d}{dt}\cdot Ia\sin\theta - Ia\frac{d}{dt}\cdot\sin\theta\right)$$
$$= -L_d \cdot Ia\frac{d}{dt}\cdot\sin\theta$$
$$= -L_d \cdot \omega_{re} \cdot Ia \cdot \cos\theta$$
$$= -L_d \cdot \omega_{re} \cdot i_\beta$$

In the same manner, a differential term for the β-axis component $i_β$ in the extended induced voltage model can be rewritten according to a fourth formula.

$$pL_d \cdot i_β = L_d \cdot \omega_{re} \cdot i_α$$

Therefore, the second formula can be simplified and rewritten, and a fifth formula expressing the approximate induced voltage model according to embodiments of the present invention is obtained by inserting the third and fourth formulas to the second formula.

$$\begin{bmatrix} e_α \\ e_β \end{bmatrix} = \begin{bmatrix} V_α^* \\ V_β^* \end{bmatrix} - \begin{bmatrix} R & -\omega_{re} L_q \\ \omega_{re} L_q & R \end{bmatrix} \begin{bmatrix} i_α \\ i_β \end{bmatrix}$$

In this fifth formula, the approximate induced voltage model for calculating the components $e_α$ and $e_β$ is expressed by the stator resistance R, the rotational speed $\omega_{re}$ and the q-axis inductance Lq. Therefore, when it is regarded that the differentiated value of the wave height Ia with respect to time is substantially equal to zero, that is, the wave height is substantially constant, differential terms included in the extended induced voltage model can be removed in the approximate induced voltage model. When the components $e_α$ and $e_β$ are calculated based on the approximate induced voltage model not including differential terms, an amount of calculation can be considerably reduced.

An estimated position calculator 15 calculates a first estimated magnetic pole position $\theta_{es1}$ from the components $e_α$ and $e_β$ calculated in the calculator 14 (step S13).

Because a voltage vector determined by differentiating a magnetic flux (i.e., magnetic pole position) of a rotor with respect to time is advanced by 90 degrees from the magnetic flux, the relation of $\tan \theta_{es1} = -e_α/e_β$ is satisfied.

Therefore, the position $\theta_{es1}$ is obtained by an arctangent calculation according to a sixth formula.

$$\theta_{es1} = \tan^{-1} \frac{-e_α}{e_β}$$

When no noises are superimposed on the induced voltage, the position $\theta_{es1}$ is outputted to the transformers 5 and 12 as a final estimated magnetic pole position $\theta_{es}$. A differential processing unit 16 differentiates the position $\theta_{es1}$ with respect to time according to a seventh formula to obtain the estimated rotational speed $\omega_{es}$ of the rotor (step S14).

$$\omega_{es} = \frac{s}{1 + \tau \cdot s} \cdot \theta_{es1}$$

Here, a differential operator s and a constant τ are used in this formula.

The position $\theta_{es1}$ denotes an alternating current component corresponding to the induced voltage, and this component periodically changes with time in response to the components $e_α$ and $e_β$. When the position $\theta_{es1}$ is differentiated, the position $\theta_{es1}$ denoting the alternating current component can be converted into the speed $\omega_{es}$ denoting a direct current component which is constant with respect to time.

The inductances Ld and Lq are changed with time due to dead time generated by the actuation of the motor 10 and/or salience of magnetic poles. Therefore, when the induced voltage components $e_α$ and $e_β$ are calculated, high frequency components are superimposed on the induced voltage as noises. When the position $\theta_{es1}$ is derived from the induced voltage, the high frequency components inversely influence on the position $\theta_{es1}$. Therefore, precision of the estimation of a magnetic pole is degraded by the high frequency components.

A low pass filter 17 performs a low pass filtering for the speed $\omega_{es}$ to remove the high frequency components from the speed $\omega_{es}$ (step S15). Because the speed $\omega_{es}$ is expressed by a direct current component, the high frequency components can be reliably removed from the speed $\omega_{es}$.

Figure 3:
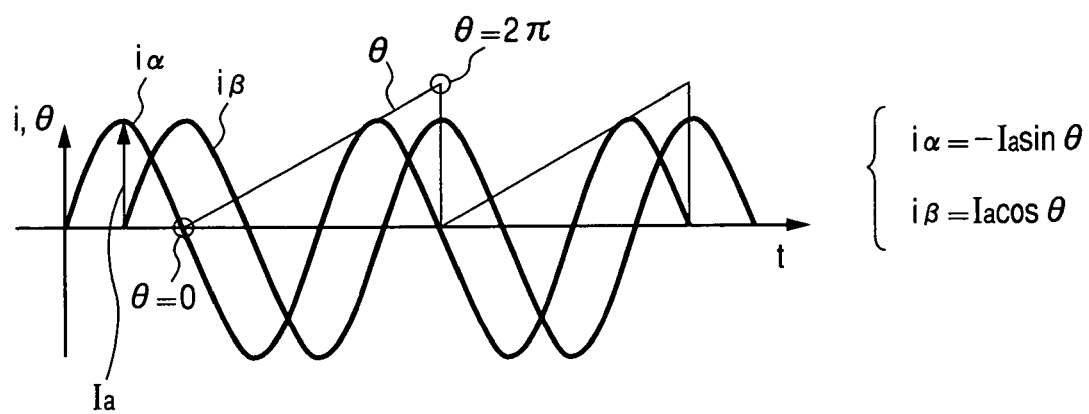
FIG. 3 shows wave shapes of detected alternating currents having a constant wave height and a wave shape of a magnetic pole position.

FIG. 3 shows a wave shape of each of detected alternating currents $i_α$ ($i_α = -Ia \cdot \sin \theta$) and ($i_β = Ia \cdot \cos \theta$) and a wave shape of a magnetic pole position θ indicated by a saw tooth wave. As shown in FIG. 3, high frequency components can be removed from an estimated position θ without loosing information of start and end positions (θ=0, 2π) of a magnetic pole. The start and end positions are placed on the α-axis. Therefore, precision of the estimation of a magnetic pole position can be improved when the coordinates transformation is performed in the transformer 5 based on a final estimated pole position not including high frequency components.

The filter 17 outputs the speed $\omega_{es}$ to the calculator 1 and an integrator 18. The integrator 18 integrates the speed $\omega_{es}$ with respect to time to obtain a second estimated magnetic pole position $\theta_{es2}$ (step S16). The position $\theta_{es2}$ denotes a position from which the high frequency components included in the position $\theta_{es1}$ are removed.

When the position $\theta_{es2}$ is obtained by filtering the position $\theta_{es1}$ in the filter 17, a phase delay occurs in the position $\theta_{es2}$. To compensate this phase delay, a phase compensating adder 19 adds a first phase compensating value outputted from a phase compensator 20 to the position $\theta_{es2}$ to obtain a final estimated magnetic pole position $\theta_{es}$ (step S17).

To calculate the phase compensating value in the compensator 20, a third difference calculator 21 calculates a positional difference $\Delta\theta_{es}$ ($=\theta_{es1}-\theta_{es}$) between the estimated positions $\theta_{es1}$ and $\theta_{es}$ (step S18), and the compensator 20 multiplies the difference $\Delta\theta_{es}$ by a first proportion and integration (PI) gain set at a value of Kp1+Ki1/s (1/s denotes an integration with respect to time) to obtain the first phase compensating value (step S19).

Because a phase lock loop (PLL) is constituted by the adder 19, the compensator 20 and the calculator 21, a phase of the position $\theta_{es}$ can approach a phase of the position $\theta_{es1}$. That is, the position $\theta_{es}$ synchronized in phase with the position $\theta_{es1}$ can be obtained (step S20). Therefore, although the phase delay is caused to remove the high frequency components in the filtering, a phase delay in the position $\theta_{es}$ can be prevented by adding the first phase compensating value to the position $\theta_{es2}$.

The final estimated position $\theta_{es}$ is outputted to the transformers 5 and 12 (step S21). Therefore, the estimated position $\theta_{es}$ approaches a true magnetic pole position (i.e., d-axis) of the rotor, and the transformation between the dq coordinates system and the αβ coordinates system can be correctly performed in the transformers 5 and 12. That is, the motor can stably be operated.

Accordingly, because the time depending wave height of the detected current components $i_α$ and $i_β$ is replaced with the wave height Ia substantially not depending on time t, a differential term for the components can be removed from the extended induced voltage model. Therefore, an amount of calculation required for the estimation can be reduced, and precision of the estimated position $\theta_{es}$ can be improved, as compared with a case where estimation is performed based on an induced voltage model constituted on the dq rotational coordinates system.

When the first PI gain is excessively heightened, the high frequency components are undesirably included in the position $\theta_{es}$. In this case, because precision of the estimation of a magnetic pole position is lowered, it is required not to excessively heighten the first PI gain.

In this embodiment, high frequency noises are removed in the filter 17. However, when adverse influence of the noises on the first estimated position $\theta_{es1}$ is low, the position $\theta_{es1}$ may be outputted to the transformers 5 and 12 without performing the low pass filtering for the position $\theta_{es1}$, and the speed $\omega_{es}$ obtained in the unit 16 may be outputted to the calculator 1.

Embodiment 2

Figure 4:
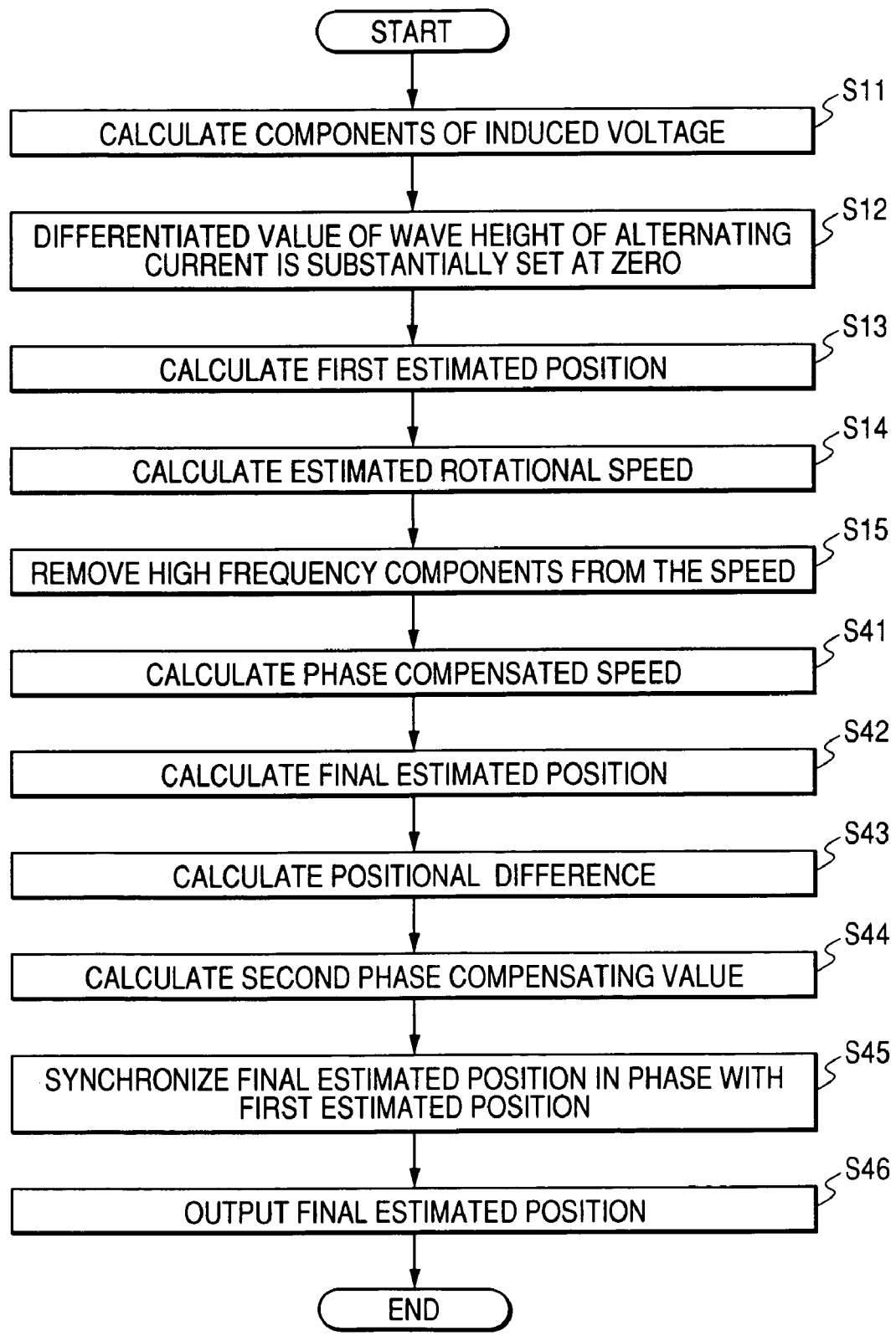
FIG. 4 is a flow chart showing the procedure of a method of estimating a magnetic pole position according to a second embodiment of the present invention.
Figure 5:
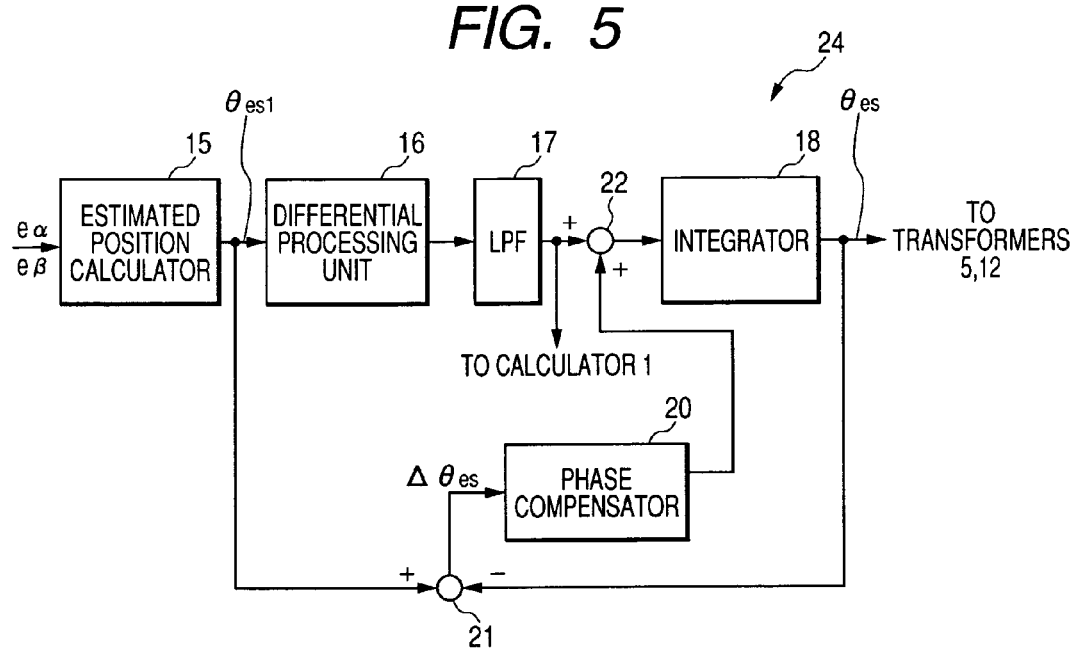
FIG. 5 is a block diagram of a position and speed estimating unit of the control unit wherein the method shown in FIG. 4 is performed.

FIG. 4 is a flow chart showing the procedure of a method of estimating a magnetic pole position according to a second embodiment of the present invention. FIG. 5 is a block diagram of another estimating unit 24 wherein the method shown in FIG. 4 is performed.

As shown in FIG. 4 and FIG. 5, an estimating unit 24 has a phase compensating adder 22 arranged between the filter 17 and integrator 18, in place of the adder 19. The adder 22 adds a second phase compensating value outputted from the compensator 20 to the speed $\omega_{es}$ outputted from the filter 17 to obtain a phase compensated speed $\omega_{es}$ (step S41). The integrator 18 integrates this speed $\omega_{es}$ with respect to time to obtain a final estimated magnetic pole position $\theta_{es}$ (step S42). The calculator 21 calculates a positional difference $\Delta\theta$ es ($=\theta_{es1} - \theta_{es}$) between the estimated positions $\theta_{es1}$ and $\theta_{es}$ (step S43). The compensator 20 multiplies the difference $\Delta\theta_{es}$ by a second PI gain set at a value of Kp2+Ki2/s to obtain the second phase compensating value (step S44).

A phase lock loop (PLL) is constituted by the calculator 21, the compensator 20 and the adder 22. Therefore, a phase synchronization of the final estimated position $\theta_{es}$ with the first estimated position $\theta_{es1}$ is performed in the PLL, and the position $\theta_{es}$ synchronized in phase with the position $\theta_{es1}$ can be obtained (step S45). The position $\theta_{es}$ synchronized with the position $\theta_{es1}$ is outputted to the transformers 5 and 12 (step S46). Accordingly, in the same manner as in the first embodiment, a phase delay in the position $\theta_{es}$ can be prevented, and the same effects as in the first embodiment can be obtained.

Figure 6:
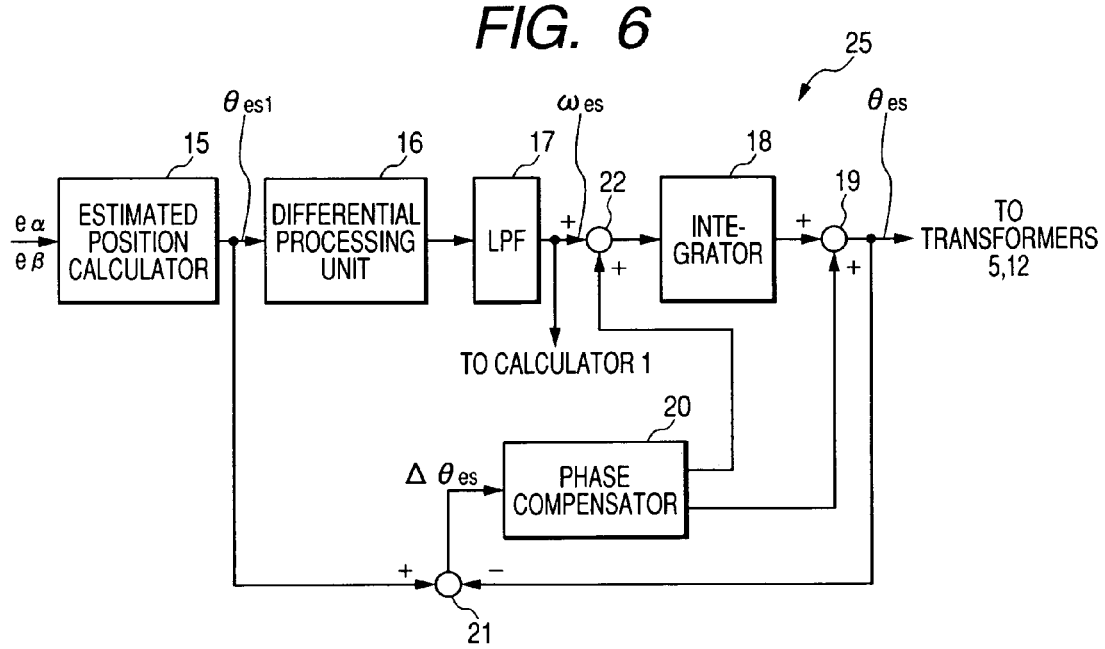
FIG. 6 is a block diagram of a position and speed estimating unit of the control unit according to a modification of the second embodiment.

FIG. 6 is a block diagram of an estimating unit 25 according to a modification of the second embodiment.

As shown in FIG. 6, an estimating unit 25 may have both the adders 19 and 22. The compensator 20 outputs the first and second phase compensating values to the adders 19 and 22, respectively. The adder 22 adds the second phase compensating value to the speed $\omega_{es}$ outputted from the filter 17 to obtain a phase compensated speed $\omega_{es}$. The integrator 18 integrates this speed $\omega_{es}$ to obtain a second estimated magnetic pole position $\theta_{es2}$. The adder 19 adds the first phase compensating value to the position $\theta_{es2}$ to obtain a final estimated magnetic pole position $\theta_{es}$.

A phase lock loop (PLL) is constituted by the calculator 21, the compensator 20 and the adders 19 and 22, so that the position $\theta_{es}$ synchronized with the position $\theta_{es1}$ can be outputted to the transformers 5 and 12. Accordingly, a phase delay in the position $\theta_{es}$ can be further prevented.

Embodiment 3

In the first embodiment, to remove high frequency components (i.e., noises) superimposed on extended induced voltage components $e_\alpha$ and $e_\beta$, the position $\theta_{es1}$ expressed by an alternating current component is converted into the speed $\omega_{es}$ expressed by a direct current component. In contrast, in the third embodiment, the voltage components $e_\alpha$ and $e_\beta$ expressed by alternating current components are directly converted into extended induced voltage components $e_d$ and $e_q$ expressed by direct current components to remove noises from the voltage components $e_d$ and $e_q$.

Figure 7A:
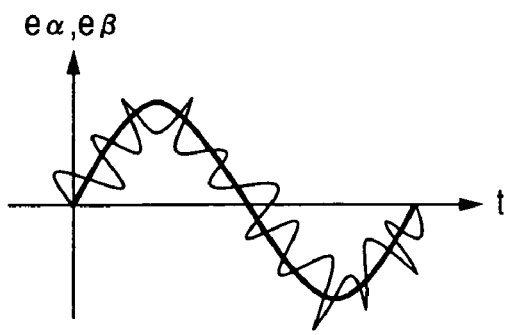
FIG. 7A shows a wave shape of an extended induced voltage with noises in an $\alpha\beta$ coordinates system according to a third embodiment of the present invention.
Figure 7B:
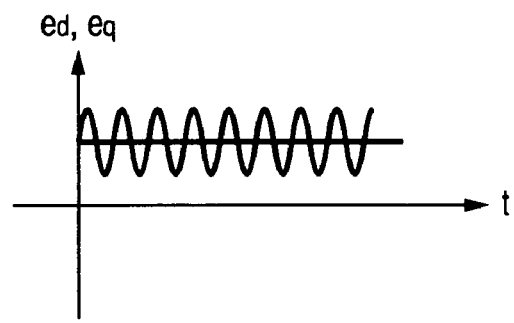
FIG. 7B shows a wave shape of an extended induced voltage with noises in a dq coordinates system according to the third embodiment.
Figure 7C:
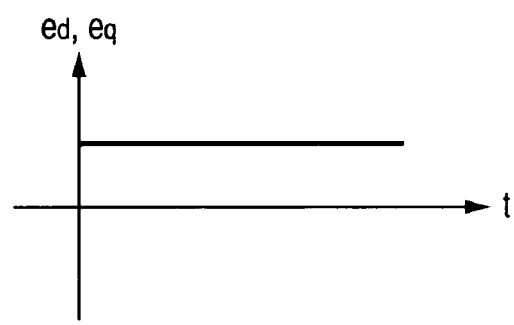
FIG. 7C shows a wave shape of a filtered extended induced voltage in the dq coordinates system.
Figure 7D:
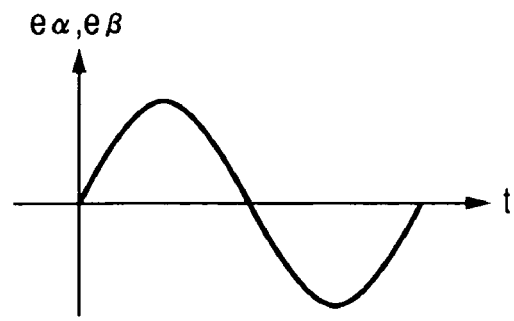
FIG. 7D shows a wave shape of a filtered extended induced voltage in the $\alpha\beta$ coordinates system.
Figure 8:
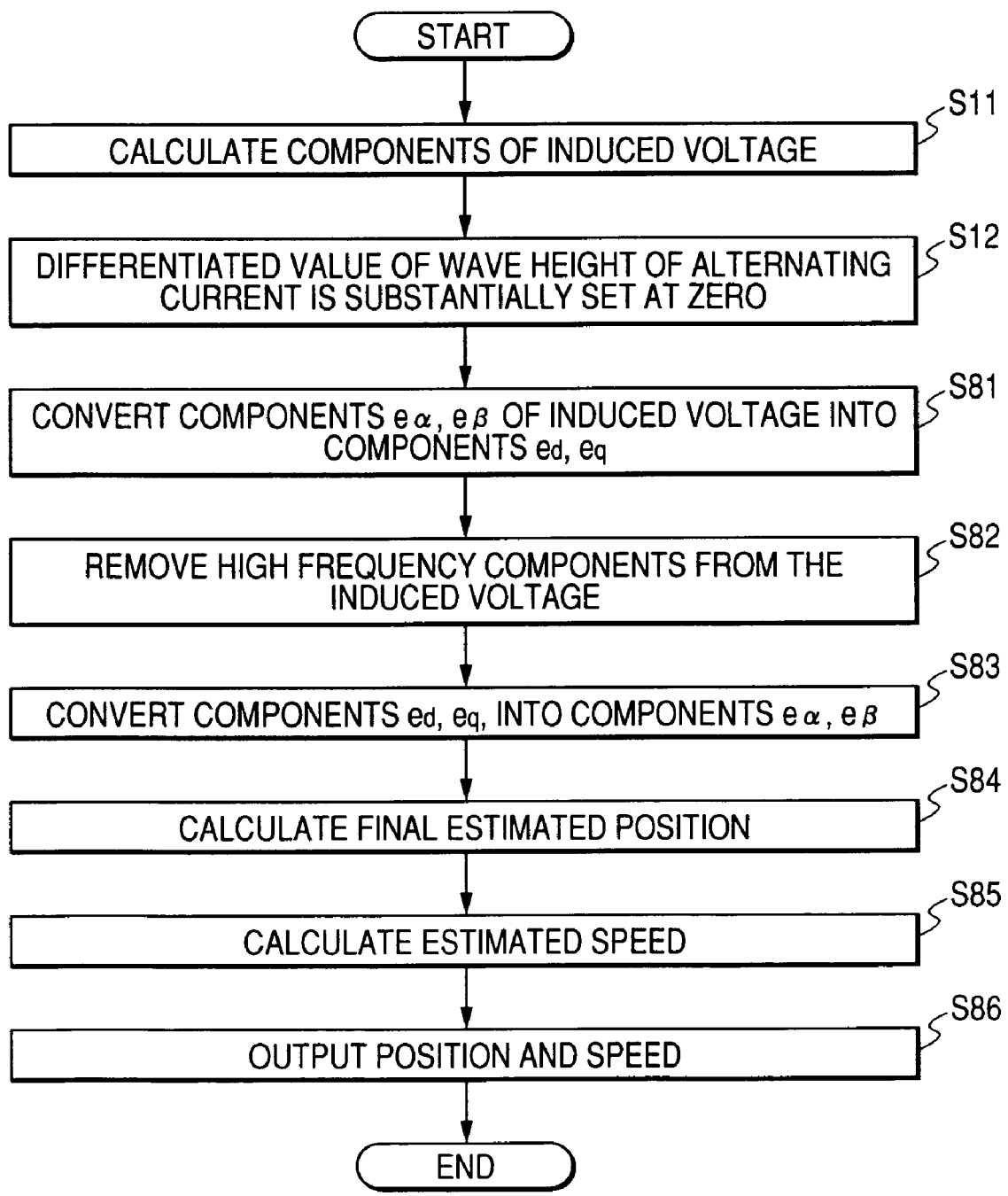
FIG. 8 is a flow chart showing the procedure of a method of estimating a magnetic pole position according to the third embodiment.

FIG. 7A shows a wave shape of an extended induced voltage in the $\alpha\beta$ coordinates system, FIG. 7B shows a wave shape of an extended induced voltage in the dq coordinates system, FIG. 7C shows a wave shape of a filtered extended induced voltage in the dq coordinates system, and FIG. 7D shows a wave shape of a filtered extended induced voltage in the $\alpha\beta$ coordinates system. FIG. 8 is a flow chart showing the procedure of a method of estimating a magnetic pole position according to the third embodiment.

Because the voltage components $e_\alpha$ and $e_\beta$ are defined in the two-phase alternating current coordinates system (e.g., $\alpha\beta$ coordinates system), the voltage components $e_\alpha$ and $e_\beta$ change with time. As shown in FIG. 7A, when high frequency components denoting noises are superimposed on the extended induced voltage, it is difficult to remove the noises from the components $e_\alpha$ and $e_\beta$.

Therefore, as shown in FIG. 7B, the components $e_\alpha$ and $e_\beta$ of the calculator 14 are converted into components $e_d$ and $e_q$ of the extended induced voltage by transforming the $\alpha\beta$ stationary coordinates system into the dq rotational coordinates system (step S81 in FIG. 8). The extended induced voltage is expressed by direct current components $e_d$ and $e_q$, so that high frequency noises can be easily removed from components $e_d$ and $e_q$. Then, a low pass filtering is performed for the components $e_d$ and $e_q$ to remove high frequency components from the extended induced voltage (step S82 in FIG. 8). Therefore, as shown in FIG. 7C, the components $e_d$ and $e_q$ not including high frequency components are obtained. Then, the components $e_d$ and $e_q$ are converted into components $e_\alpha$ and $e_\beta$ by transforming the dq rotational coordinates system into the $\alpha\beta$ stationary coordinates system (step S83 in FIG. 8). Therefore, as shown in FIG. 7D, the components $e_\alpha$ and $e_\beta$ not including noises are obtained.

Thereafter, a final estimated magnetic pole position $\theta_{es}$ not including noises is calculated from the components $e_\alpha$ and $e_\beta$ according to an eighth formula (step S84 in FIG. 8).

$$\theta_{es} = \tan^{-1} \frac{-e_\alpha}{e_\beta}$$

Then, the position $\theta_{es}$ is differentiated with respect to time according to a ninth formula to obtain an estimated magnetic pole speed $\omega_{es}$ (i.e., rotational speed of rotor) (step S85 in FIG. 8).

$$\omega_{es} = \frac{s}{1+\tau \cdot s}\theta_{es}$$

The position $\theta_{es}$ is outputted to the transformers 5 and 12 shown in FIG. 2, and the speed $\omega_{es}$ is outputted to the calculator 1 shown in FIG. 2 (step S86 in FIG. 8).

Accordingly, because high frequency noises are removed from the direct current components of the extended induced voltage, the same effects as in the first embodiment can be obtained.

In this embodiment, phase compensation for phase delay caused in step S82 may be performed for the estimated magnetic pole position in the same manner as in the first embodiment.

Embodiment 4

Figure 9:
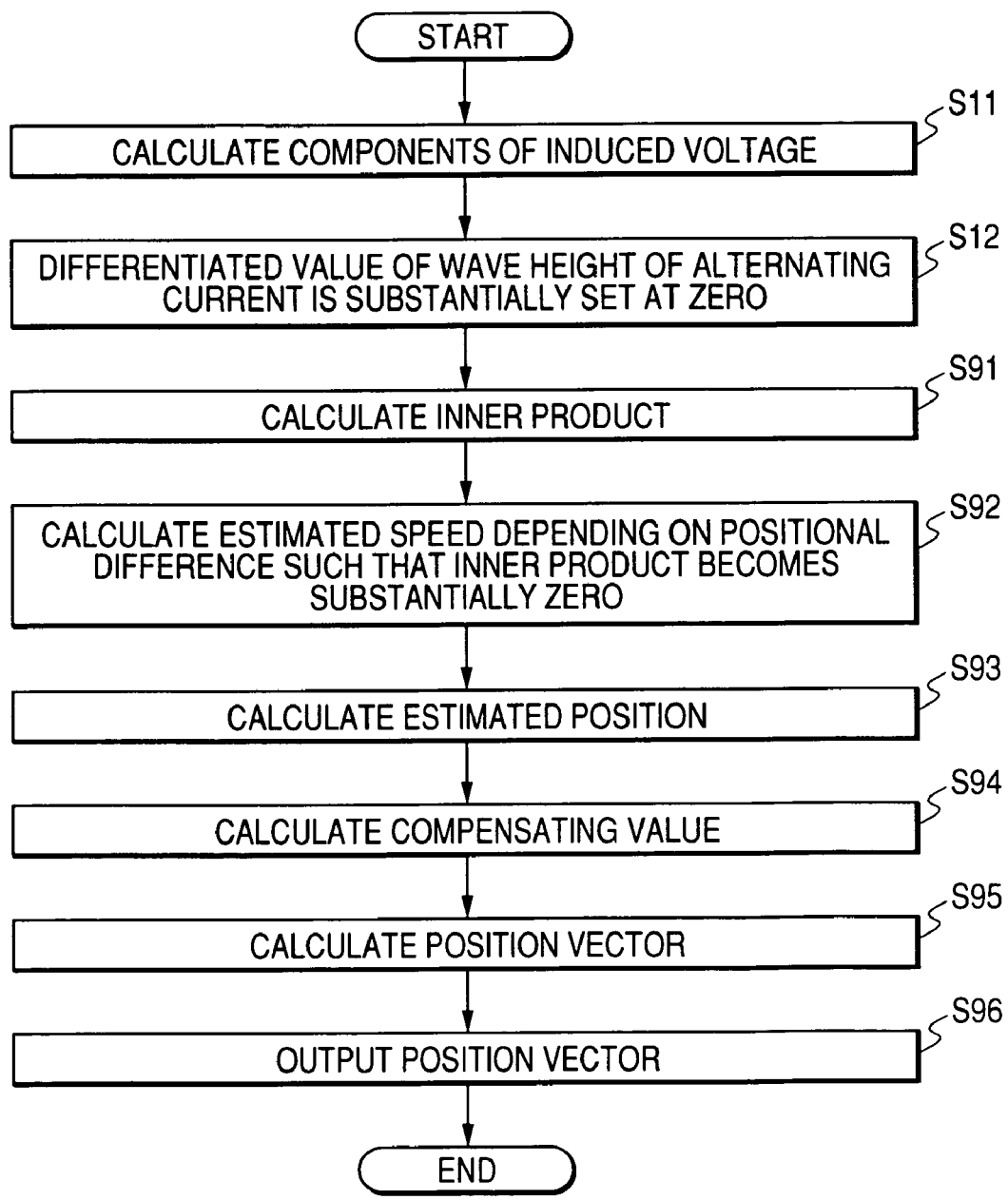
FIG. 9 is a flow chart showing the procedure of a method of estimating a magnetic pole position according to a fourth embodiment.
Figure 10:
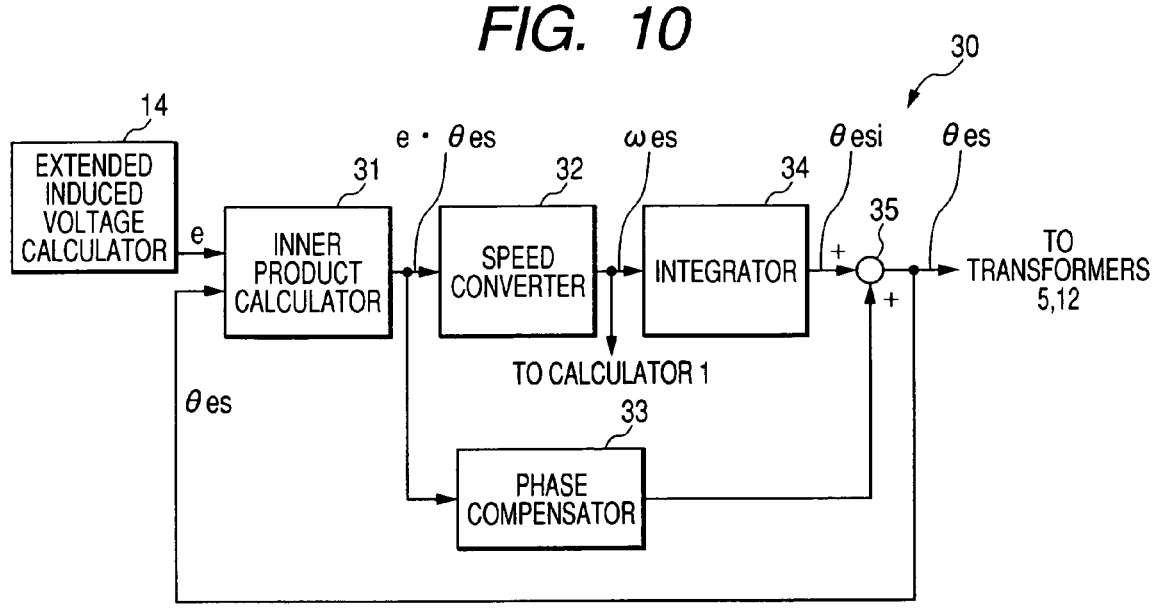
FIG. 10 is a block diagram of a position and speed estimating unit wherein the method shown in FIG. 9 is performed.

FIG. 9 is a flow chart showing the procedure of a method of estimating a magnetic pole position according to the fourth embodiment, and FIG. 10 is a block diagram of a position and speed estimating unit wherein the method shown in FIG. 9 is performed.

As shown in FIGS. 9 and 10, a position and speed estimating unit 30 calculates an estimated magnetic pole position from the extended induced voltage. More specifically, an inner product calculator 31 of the unit 30 calculates an inner product of an extended induced voltage vector e ($e_\alpha, e_\beta$) and an estimated position vector $\theta_{es}$ of an estimated magnetic pole position according to a tenth formula (step S91).

$$e \cdot \theta_{es} = |e||\theta_{es}|\cos\left(\frac{\pi}{2} + \Delta\theta\right)$$
$$= -|e||\theta_{es}|\sin(\Delta\theta)$$

$\Delta\theta$ denotes a difference in angle between vectors $\theta_{es}$ and $\theta_c$, and $\theta_c$ denotes a true magnetic pole position placed on the d-axis.

Figure 11:
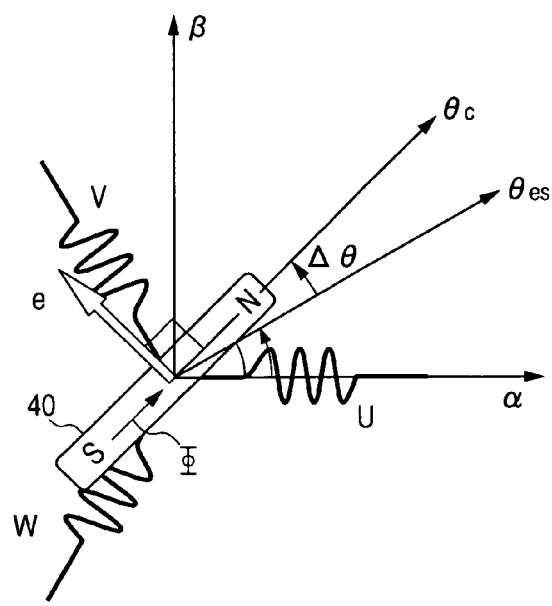
FIG. 11 shows a positional relation between a voltage vector and a position vector of an estimated position.

FIG. 11 shows a positional relation between the vectors e and $\theta_{es}$. The voltage vector e is obtained by differentiating a magnetic flux $\Phi$ of a rotor 40 of the motor 10 with respect to time. The flux $\Phi$ is directed from an S magnetic pole to an N magnetic pole. Therefore, as shown in FIG. 11, the voltage vector e is advanced by 90 degrees from the direction of the flux $\Phi$. Further, a position (or angle) indicated by the flux is equivalent to a true magnetic pole position of the rotor. Therefore, when the vector $\theta_{es}$ correctly indicates the true magnetic pole position of the rotor, an inner product of the vector e and the vector $\theta_{es}$ becomes zero. In other words, when the vector $\theta_{es}$ is corrected such that the inner product substantially becomes zero, the vector $\theta_{es}$ correctly indicates the true magnetic pole position $\theta_c$ of the rotor.

A speed converter 32 multiplies the inner product by a third PI gain set at a value of Kp3+Ki3/s to obtain an estimated speed $\omega_{es}$ (step S92). That is, the converter 32 does not output a speed calculated according to the seventh formula but outputs a speed depending on a positional difference $\Delta\theta$ between the vectors $\theta_{es}$ and $\theta_c$. This means that the converter 32 can calculates the speed $\omega_{es}$ such that a corrected position derived from the speed $\omega_{es}$ approach the true position $\theta_c$ and such that an inner product calculated from the corrected position substantially becomes zero. The speed $\omega_{es}$ is outputted to the calculator 1 shown in FIG. 1 and an integrator 34. The integrator 34 integrates the speed $\omega_{es}$ with respect to time to obtain an intermediate estimated magnetic pole position $\theta_{esi}$ (step S93).

Further, a phase delay occurs in the position $\theta_{esi}$ due to the integration. To compensate this phase delay, a phase compensator 33 multiplies the inner product by a fourth PI gain set at a value of Kp4+Ki4/s to obtain a compensating value (step S94). An adder 35 adds this compensating value to the position $\theta_{esi}$ to obtain the position vector $\theta_{es}$ (step S95). The vector $\theta_{es}$ is outputted as a final estimated magnetic pole position to the transformer 5 shown in FIG. 1 and the calculator 31 (step S96).

When a position (or angle) indicated by the vector $\theta_{es}$ is shifted from a true magnetic pole position $\theta_c$ by a position error $\Delta\theta$, it is required that the converter 32 calculates a speed $\omega_{es}$, which is heightened or lowered based on the position error $\Delta\theta$, such that an estimated position calculated from the speed $\omega_{es}$ approaches the position $\theta_c$. Because a value of the inner product corresponds to the error $\Delta\theta$, the converter 32 can calculates a speed $\omega_{es}$ depending on the error $\Delta\theta$ such that an estimated position $\theta_{es}$ obtained from the speed $\int \omega_{es}$ substantially reaches the true position $\theta_c$. Therefore, the pole position $\theta_{es}$ estimated in the unit 30 can substantially reach the true position $\theta_c$.

As shown in FIG. 11, for example, when an estimated position vector $\theta_{es}$ is delayed from the true position $\theta_c$ (i.e., $\Delta\theta>0$), the converter 32 calculates a speed $\omega_{es}$ which is higher than a speed obtained by differentiating the position vector $\theta_{es}$ with respect to time according to the seventh formula. Therefore, the heightened speed $\omega_{es}$ is calculated based on the error $\Delta\theta$, and the position vector $\theta_{es}$ can approach the true position $\theta_c$.

Although high frequency components superimposed on the voltage vector e is transferred to the speed $\omega_{es}$, the components are smoothed in the integration of the speed $\omega_{es}$. Therefore, the integrator 34 substantially performs the filtering processing in addition to the integration.

As described above, because an estimated speed $\omega_{es}$ obtained by multiplying the inner product by the third PI gain depends on the position error $\Delta\theta$, the speed $\omega_{es}$ can be heightened or lowered based on the position error $\Delta\theta$. Accordingly, when an estimated position vector $\theta_{es}$ is obtained from the speed $\omega_{es}$ so as to substantially reduce the inner product to zero, the position vector $\theta_{es}$ can be appropriately corrected and approach the true position $\theta_c$.

Embodiment 5

Figure 12:
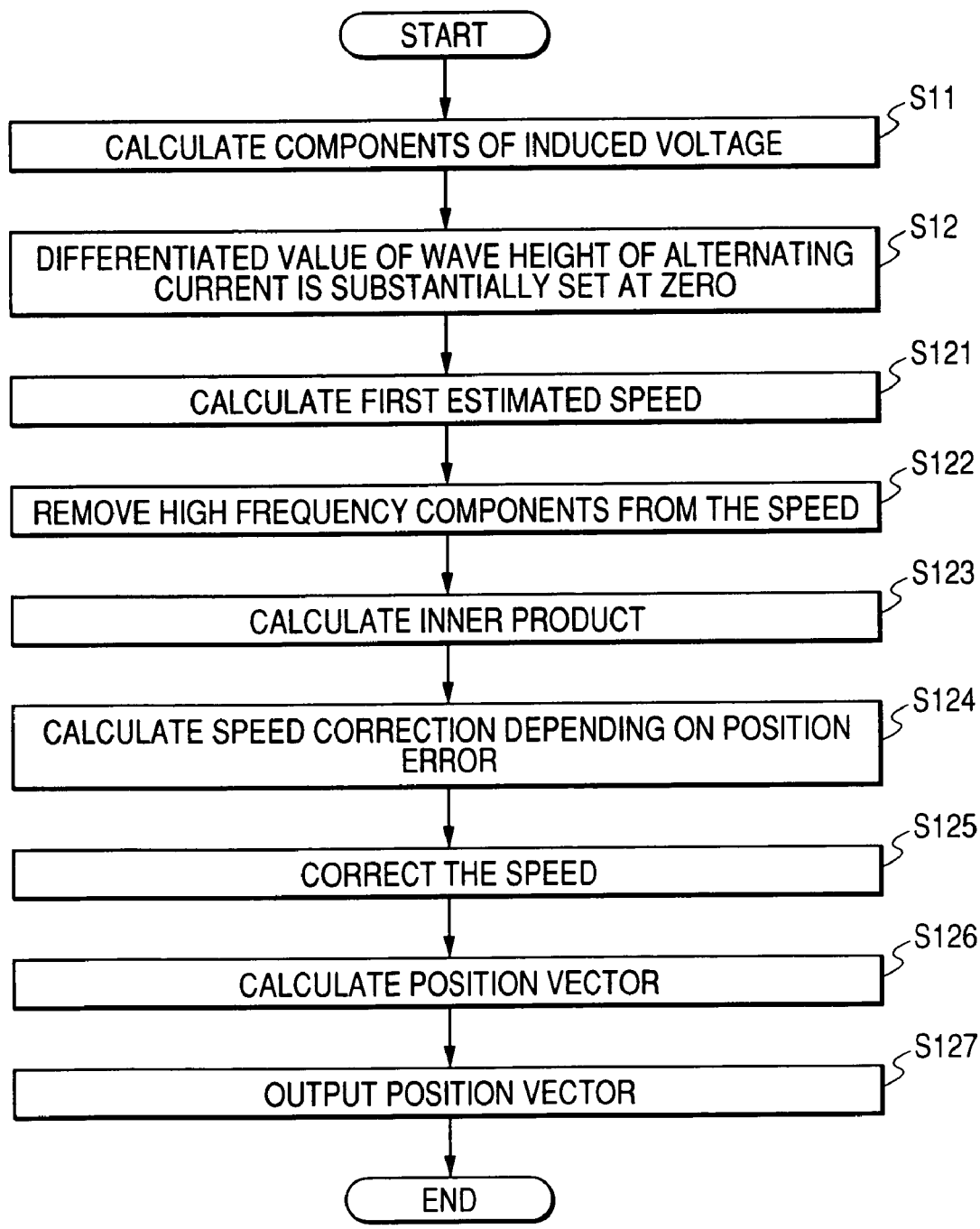
FIG. 12 is a flow chart showing the procedure of a method of estimating a magnetic pole position according to a fifth embodiment.
Figure 13:
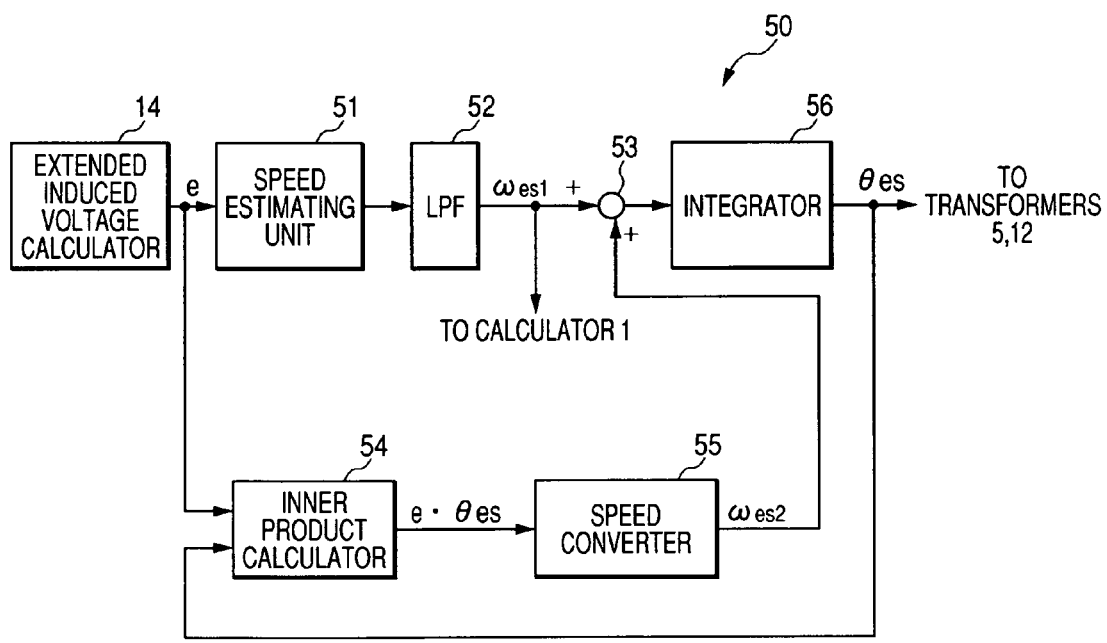
FIG. 13 is a block diagram of a position and speed estimating unit wherein the method shown in FIG. 12 is performed.

FIG. 12 is a flow chart showing the procedure of a method of estimating a magnetic pole position according to the fifth embodiment, and FIG. 13 is a block diagram of a position and speed estimating unit wherein the method shown in FIG. 12 is performed.

As shown in FIGS. 12 and 13, in a position and speed estimating unit 50, a speed estimating unit 51 successively receives extended induced voltage vectors $e(e_\alpha, e_\beta)$ from the calculator 14 and calculates a first estimated speed $\omega_{es1}$ from the vectors $e_{t1}$ and $e_{t2}$ calculated at different times t1 and t2 in the calculator 14 (step S121). That is, the speed $\omega_{es1}$ is calculated from a time interval between the times t1 and t2 and a positional difference between the vectors $e_{t1}$ and $e_{t2}$.

High frequency components denoting noises are superimposed on each of the vectors $e_{t1}$ and $e_{t2}$, so that the components exist in the speed $\omega_{es1}$. A low pass filter 52 removes the components from the speed $\omega_{es1}$ (step S122), so that noises existing in the speed $\omega_{es1}$ can be considerably reduced. In this low pass filtering, a phase delay occurs in the speed $\omega_{es1}$.

Further, in the same manner as the calculator 31 and converter 32 in the fourth embodiment, an inner product calculator 54 calculates an inner product of the voltage vector $e(e_\alpha, e_\beta)$ and an estimated position vector $\theta_{es}$ indicating an estimated magnetic pole position of the rotor 40 (step S123), and a speed converter 55 multiplies the calculated inner product by the third PI gain to obtain a speed correction $\omega_{es2}$ (step S124). The speed correction depends on a position error $\Delta\theta$ between an estimated position of the vector $\theta_{es}$ and a true position $\theta_c$ of the magnetic pole. An adder 53 adds the speed correction $\omega_{es2}$ to the estimated speed $\omega_{es1}$ to correct the speed $\omega_{es1}$ and to compensate the phase delay of the speed $\omega_{es1}$ (step S125). Therefore, a final estimated speed $\omega_{es}$ ($=\omega_{es1}+\omega_{es2}$) having no phase delay is obtained. The speed $\omega_{es}$ is outputted to the calculator 1 shown in FIG. 1 and an integrator 56. The integrator 56 integrates the speed $\int \omega_{es}$ with respect to time to obtain the vector $\theta_{es}$ (step S126). The position vector $\theta_{es}$ is outputted as a final estimated magnetic pole position to the transformer 5 shown in FIG. 1 and the calculator 54 (step S127).

The speed correction $\omega_{es2}$ is determined based on a position error between an estimated position and a true position $\theta_c$ of the magnetic pole. Therefore, the speed correction $\omega_{es2}$ can be determined such that an inner product derived from the speed $\omega_{es}$ is substantially set to zero, and the position vector $\theta_{es}$ corrected by the speed correction can approach the true position $\theta_c$, in the same manner as in the fourth embodiment. Accordingly, in the same manner as in the first embodiment, a phase delay in the position $\theta_{es}$ can be prevented, and the same effects as those in the first embodiment can be obtained.

Figure 14:
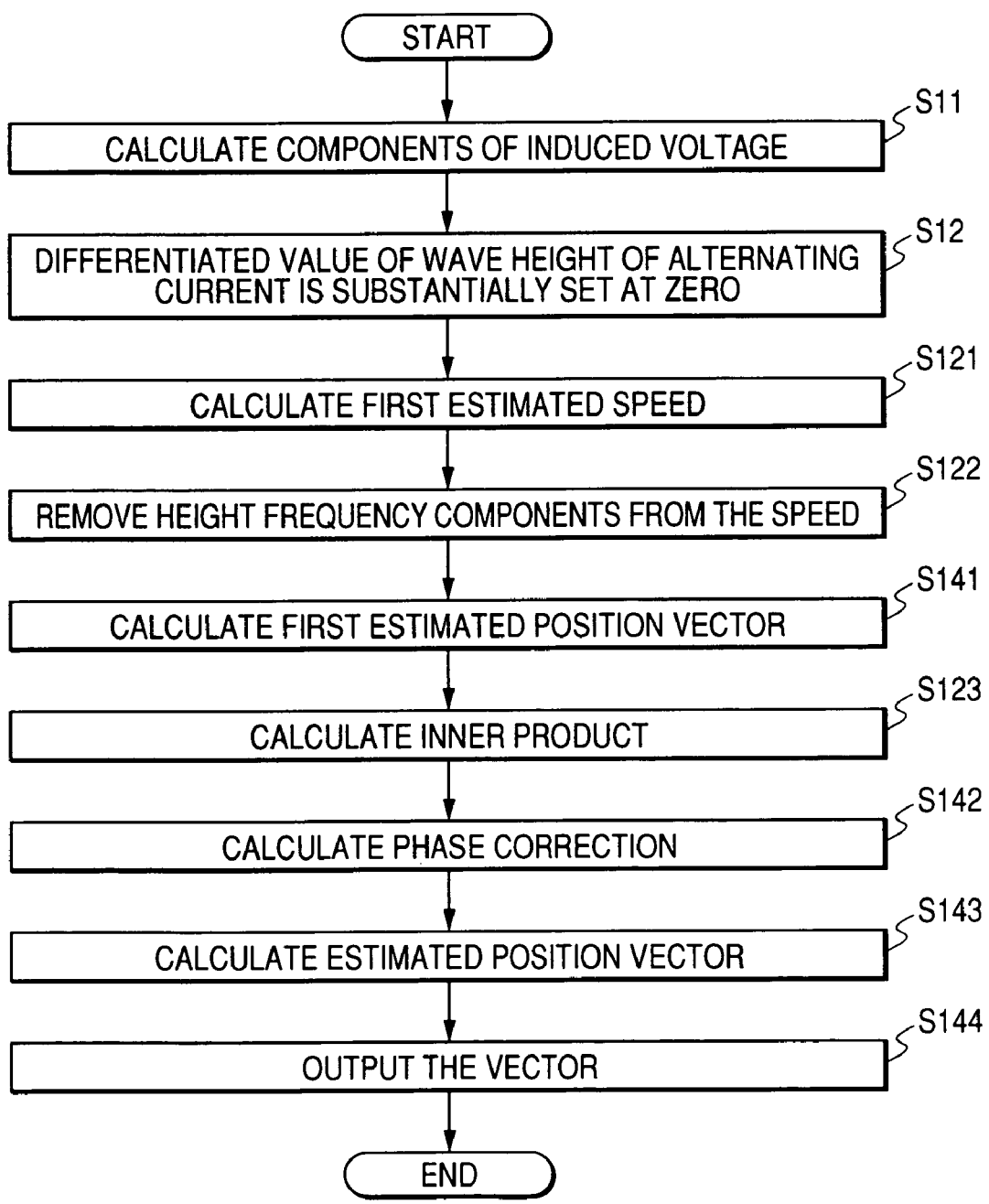
FIG. 14 is a flow chart showing the procedure of a method of estimating a magnetic pole position according to a first modification of the fifth embodiment.
Figure 15:
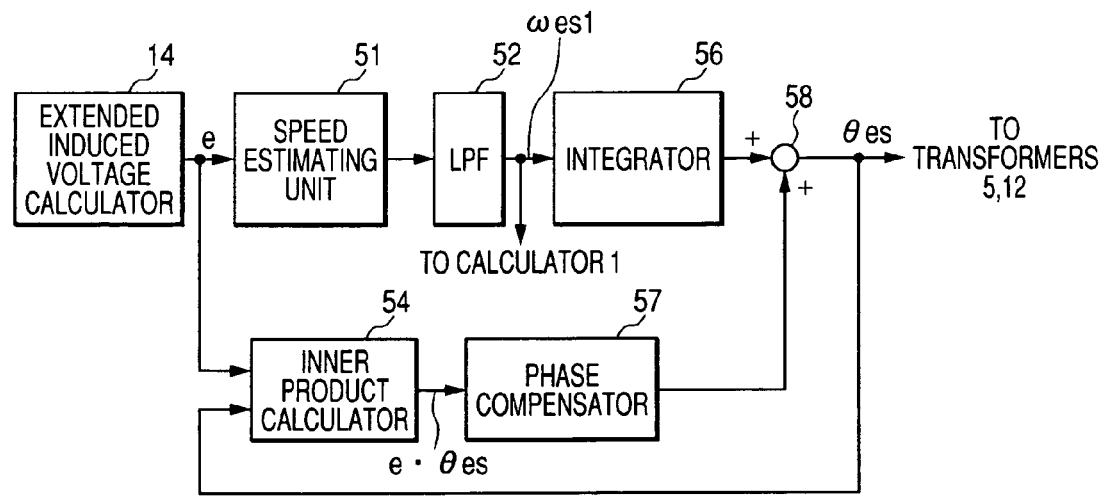
FIG. 15 is a block diagram of a position and speed estimating unit wherein the method shown in FIG. 14 is performed.

FIG. 14 is a flow chart showing the procedure of a method of estimating a magnetic pole position according to a first modification of the fifth embodiment, and FIG. 15 is a block diagram of a position and speed estimating unit wherein the method shown in FIG. 14 is performed.

As shown in FIG. 14 and FIG. 15, a phase compensator 57 may be used in place of the converter 55. More specifically, the integrator 56 integrates the speed $\omega_{es1}$ outputted from the filter 52 with respect to time to obtain a first estimated position vector $\theta_{es1}$ (step S141). The compensator 57 multiplies the inner product outputted from the calculator 54 by the fourth PI gain to obtain a phase correction (or position correction) (step S142). To correct the position vector $\theta_{es1}$ and to compensate the phase delay caused in the filter 52, an adder 58 adds the phase correction to the position vector $\theta_{es1}$ to obtain an estimated position vector $\theta_{es}$ denoting a final estimated magnetic pole position (step S143). The vector $\theta_{es}$ is outputted to the transformers 5 and 12 (step S144).

Because the phase correction is increased or decreased based on the inner product, the vector $\theta_{es}$ can approach a true position $\theta_c$ of the magnetic pole, in the same manner as in the fourth embodiment. Accordingly, a phase delay in the position $\theta_{es}$ can be prevented, and the same effects as those in the first embodiment can be obtained.

Figure 16:
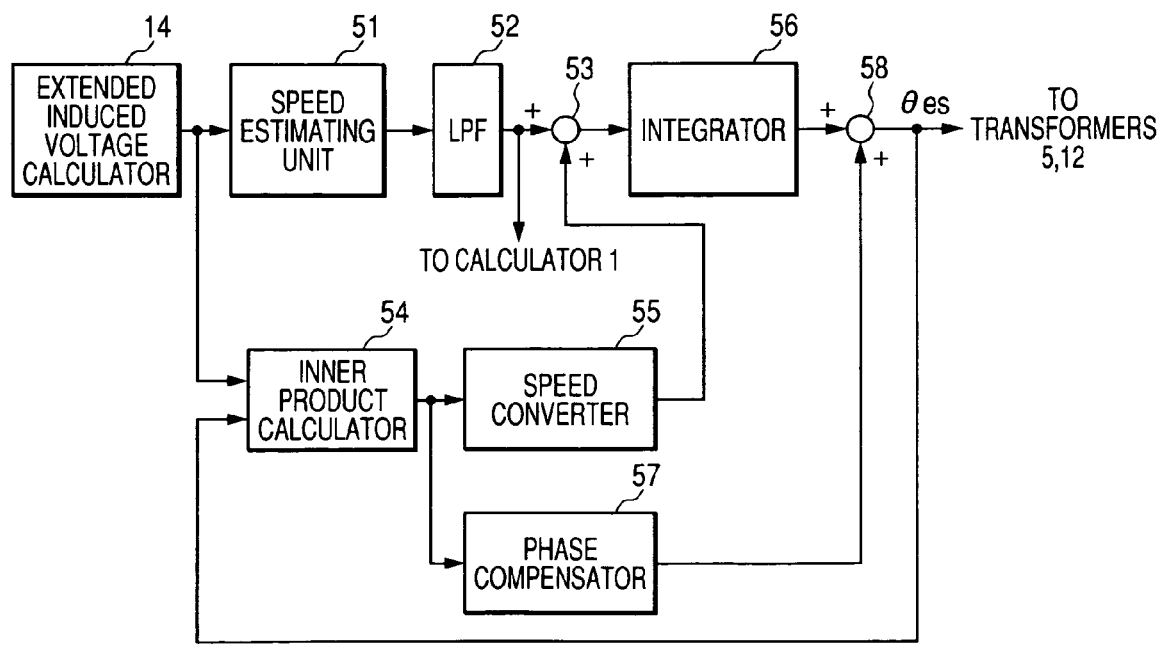
FIG. 16 is a block diagram of a position and speed estimating unit wherein a second modification of the fifth embodiment is performed.

FIG. 16 is a block diagram of a position and speed estimating unit wherein a second modification of the fifth embodiment is performed.

As shown in FIG. 16, both the converter 55 and the compensator 57 may be used. More specifically, the adder 53 adds the speed correction $\omega_{es2}$ to the speed $\omega_{es1}$ to obtain a corrected speed $\omega_{es}$, and the integrator 56 obtains an estimated position $\theta_{es1}$ from the corrected speed $\omega_{es}$. The adder 58 adds the phase correction to the position $\theta_{es1}$ to obtain an estimated position vector $\theta_{es}$ denoting a final estimated magnetic pole position and outputs the vector $\theta_{es}$ to the transformers 5 and 12.

These embodiments should not be construed as limiting the present invention to the methods of those embodiments, and the method according to this invention may be combined with that based on the prior art.

For example, a magnetic pole position is estimated in the $\alpha\beta$ coordinates system representing the two-phase alternating current coordinates system. However, in placed of the $\alpha\beta$ coordinates system, any two-dimensional coordinates system representing the two-phase alternating current coordinates system may be used. This two-dimensional coordinates system may be defined by two axes not orthogonal to each other and an original point placed on the rotation axis at a position different from that in the dq coordinates system.

Further, in the fourth and fifth embodiments, an inner product may be calculated from normalized vectors. More specifically, the position vector $\theta_{es}$ is divided by an absolute value of the vector $\theta_{es}$, the voltage vector e is divided by an absolute value of the vector e, and an inner product of the divided vectors is calculated. Therefore, because the inner product depends on only an angular difference (or position error) between the vectors $\theta_{es}$ and e, the estimated speed $\omega_{es}$ can precisely be calculated.

Moreover, the fourth and fifth embodiments are not limited to the inner product, and a magnetic pole position may be estimated from a second position vector $\theta_{\pm 90es}$ which is advanced or delayed from the position vector $\theta_{es}$ by 90 degrees. More specifically, a second position vector $\theta_{\pm 90es}$ different from the position vector $\theta_{es}$ by an angle of $+90$ degrees or $-90$ degrees around the original point is calculated, and a length of an outer product of the vector $\theta_{\pm 90es}$ and the voltage vector e is calculated according to an eleventh formula.

$$e \times \theta_{\pm 90es} = |e||\theta_{\pm 90es}|\sin(-\Delta\theta)$$
$$= -|e||\theta_{\pm 90es}|\sin(\Delta\theta)$$

When an angle (or phase difference) between the vectors e and $\theta_{es}$ substantially equals to 90 degrees, an angle between the vectors e and $\theta_{\pm 90es}$ substantially equals to 0 or 180 degrees. Therefore, when the position vector $\theta_{es}$ is corrected such that a value of the outer product approaches zero, the position vector $\theta_{es}$ can indicate a true magnetic pole position.

Furthermore, in the embodiments, a position of a magnetic pole of a rotor in a synchronous motor is estimated.

However, a position (i.e., rotational angle) of an arbitrary portion of the rotor may be estimated.

What is claimed is:

1. A method of estimating a magnetic pole position in a synchronous motor, comprising the steps of:

calculating an induced voltage of the motor, to which an alternating current voltage is applied and from which an alternating current is detected, from components of the applied alternating current voltage in a two-phase alternating current coordinates system and components of the detected alternating current in the two-phase alternating current coordinates system; and estimating a magnetic pole position in the motor from the induced voltage; and controlling the motor according to the estimated magnetic pole position;

wherein the alternating current consists of waves having a wave height of which a differentiated value with respect to time is substantially set at zero.

2. The method according to claim 1, wherein the induced voltage is defined in an $\alpha\beta$ coordinates system representing the two-phase alternating current coordinates system, and both an $\alpha$-axis component $e_\alpha$ and a $\beta$-axis component $e_\beta$ of the induced voltage in the $\alpha\beta$ coordinates system are calculated in the step of calculating the induced voltage according to a formula:

$$\begin{bmatrix} e_\alpha \\ e_\beta \end{bmatrix} = \begin{bmatrix} V_\alpha \\ V_\beta \end{bmatrix} - \begin{bmatrix} R & -\omega L \\ \omega L & R \end{bmatrix} \begin{bmatrix} i_\alpha \\ i_\beta \end{bmatrix}$$

by using both an α-axis component $V_\alpha$ and a β-axis component $V_\beta$ of the alternating current voltage in the αβ coordinates system, a resistance value R of a stator of the motor, a rotational speed ω in electrical angle, an inductance value L, and both an α-axis component $i_\alpha$ and a β-axis component $i_\beta$ of the alternating current in the αβ coordinates system.

3. The method according to claim 1, wherein a high frequency component is superimposed on the induced voltage, and the step of estimating the magnetic pole position comprises:
  obtaining an alternating current component from the induced voltage;
  converting the alternating current component corresponding to the induced voltage into a direct current component on which the high frequency component is superimposed;
  removing the high frequency component from the direct current component; and
  calculating the estimated magnetic pole position from the direct current component from which the high frequency component is removed.

4. The method according to claim 3, wherein the step of obtaining an alternating current component includes calculating a first magnetic pole position expressed by the alternating current component from the induced voltage, the step of converting the alternating current component includes differentiating the first magnetic pole position to obtain the direct current component, and the step of calculating the estimated magnetic pole position comprises:
  integrating the direct current component, from which the high frequency component is removed, to obtain a second magnetic pole position; and
  calculating the estimated magnetic pole position from the second magnetic pole position.

5. The method according to claim 4, wherein the step of calculating the estimated magnetic pole position comprises:
  calculating a positional difference between the first magnetic pole position and an estimated magnetic pole position previously calculated;
  obtaining a phase compensating value by multiplying the positional difference by a predetermined gain such that a position obtained by adding the phase compensating value to the second magnetic pole position is synchronized in phase with the first magnetic pole position; and
  determining the position obtained by adding the phase compensating value to the second magnetic pole position as an estimated magnetic pole position currently calculated.

6. The method according to claim 3, wherein the step of obtaining an alternating current component includes calculating a first magnetic pole position expressed by the alternating current component from the induced voltage, the step of converting the alternating current component includes differentiating the first magnetic pole position to obtain the direct current component, and the step of calculating the estimated magnetic pole position comprises:
  calculating a positional difference between the first magnetic pole position and an estimated magnetic pole position previously calculated;
  obtaining a phase compensating value by multiplying the positional difference by a predetermined gain such that a position obtained by adding the phase compensating value to the direct current component having no high frequency component is synchronized in phase with the first magnetic pole position;
  adding the phase compensating value to the direct current component, from which the high frequency component is removed, to obtain a phase compensated direct current component;
  integrating the phase compensated direct current component to obtain an integration result; and
  determining the integration result as an estimated magnetic pole position currently calculated.

7. The method according to claim 1, wherein a high frequency component is superimposed on the induced voltage, and the step of estimating the magnetic pole position comprises:
  expressing the induced voltage with alternating current components in the two-phase alternating current coordinates system;
  converting the alternating current components of the induced voltage into direct current components in a two-phase rotational coordinates system;
  removing the high frequency component from the direct current components of the induced voltage;
  converting the direct current components of the induced voltage, from which the high frequency component is removed, into second alternating current components in the two- phase alternating current coordinates system; and
  calculating the estimated magnetic pole position from the second alternating current components of the induced voltage.

8. The method according to claim 1, wherein the step of estimating the magnetic pole position comprises:
  expressing the induced voltage with an induced voltage vector defined in the two- phase alternating current coordinates system;
  setting a position vector indicating a magnetic pole position previously estimated in the two-phase alternating current coordinates system;
  correcting the position vector such that an inner product of the induced voltage vector and the position vector substantially becomes zero; and
  obtaining a position corresponding to the corrected position vector as an estimated magnetic pole position currently determined.

9. The method according to claim 8, wherein the step of setting the position vector includes:
  estimating a speed of a magnetic pole; and
  calculating the position vector from the estimated speed, and the step of correcting the position vector includes:
  correcting the estimated speed with the inner product such that an inner product derived from the corrected estimated speed substantially becomes zero; and
  calculating a corrected position vector from the corrected estimated speed.

10. The method according to claim 9, wherein the step of calculating the corrected position vector compnses:
  integrating the corrected estimated speed to obtain a phase shifted position vector;

calculating a phase compensating value from the inner product derived from the corrected estimated speed; and
calculating the corrected position vector from both the phase shifted position vector and the phase compensating value.

11. The method according to claim 8, wherein each of the induced voltage vector and the position vector is normalized in the calculation of the inner product.

12. The method according to claim 1, wherein the step of estimating the magnetic pole position comprises:
calculating a plurality of values of the induced voltage at different times;
calculating an estimated speed of a magnetic pole from the values of the induced voltage and the different times; and
calculating the estimated magnetic pole position from the estimated speed.

13. The method according to claim 12, wherein the step of calculating the estimated magnetic pole position comprises:
adding a speed correction to the estimated speed to obtain a corrected speed; and
determining the estimated magnetic pole position from the corrected speed, and
the step of adding the speed correction comprises:
expressing the induced voltage with an induced voltage vector defined in the two-phase alternating current coordinates system;
calculating an inner product of the induced voltage vector and a vector of an estimated magnetic pole position previously calculated; and
determining the speed correction as a value obtained by multiplying the inner product by a predetermined gain such that an inner product of the induced voltage vector and a vector of an estimated magnetic pole position derived from the calculated speed correction substantially becomes zero.

14. The method according to claim 13, wherein the step of calculating the estimated speed includes removing a high frequency component from the estimated speed.

15. The method according to claim 13, wherein the induced voltage vector and the position vector are normalized in the calculation of the inner product.

16. The method according to claim 12, wherein the step of calculating the estimated magnetic pole position comprises:
calculating a first magnetic pole position from the estimated speed; and
adding a phase correction to the first magnetic pole position to obtain the estimated magnetic pole position, and
the step of adding the phase correction comprises:
expressing the induced voltage with an induced voltage vector defined in the two-phase alternating current coordinates system;
calculating an inner product of the induced voltage vector and a vector of an estimated magnetic pole position previously calculated; and
determining the phase correction as a value obtained by multiplying the inner product by a predetermined gain such that an inner product of the induced voltage vector and a vector of an estimated magnetic pole position derived from the calculated phase correction substantially becomes zero.

17. The method according to claim 16, wherein the step of calculating the estimated speed includes removing a high frequency component from the estimated speed.

18. The method according to claim 16, wherein the induced voltage vector and the position vector are normalized in the calculation of the inner product.

19. The method according to claim 12, wherein the step of calculating the estimated magnetic pole position comprises:
adding a speed correction to the estimated speed to obtain a corrected speed; and
determining the estimated magnetic pole position from the corrected speed, and
the step of adding the speed correction comprises:
expressing the induced voltage with an induced voltage vector defined in the two-phase alternating current coordinates system;
setting a first position vector indicating an estimated magnetic pole position previously calculated in the two-phase alternating current coordinates system;
calculating a second position vector which is advanced or delayed from the first position vector by 90 degrees in the two-phase alternating current coordinates system;
calculating an outer product of the induced voltage vector and the second position vector; and determining the speed correction as a value obtained by multiplying the outer product by a predetermined gain such that an outer product derived from the calculated speed correction substantially becomes zero.

20. The method according to claim 19, wherein the step of calculating the estimated speed includes removing a high frequency component from the estimated speed.

21. The method according to claim 19, wherein the induced voltage vector and the second position vector are normalized in the calculation of the outer product.

22. The method according to claim 12, wherein the step of calculating the estimated magnetic pole position comprises:
calculating a first magnetic pole position from the estimated speed; and
adding a phase correction to the first magnetic pole position to obtain the estimated magnetic pole position, and
the step of adding the phase correction comprises:
expressing the induced voltage with an induced voltage vector defined in the two-phase alternating current coordinates system;
setting a first position vector indicating an estimated magnetic pole position previously calculated in the two-phase alternating current coordinates system;
calculating a second position vector which is advanced or delayed from the first position vector by 90 degrees in the two-phase alternating current coordinates system;
calculating an outer product of the induced voltage vector and the second position vector; and
determining the phase correction as a value obtained by multiplying the outer product by a predetermined gain such that an outer product derived from the calculated phase correction substantially becomes zero.

23. The method according to claim 22, wherein the step of calculating the estimated speed includes removing a high frequency component from the estimated speed.

24. The method according to claim 22, wherein the induced voltage vector and the position vector are normalized in the calculation of the outer product.

25. The method according to claim 1, wherein the step of estimating the magnetic pole position comprises:
expressing the induced voltage with an induced voltage vector defined in the two- phase alternating current coordinates system;
setting a first position vector indicating a magnetic pole position previously estimated in the two-phase alternating current coordinates system;

calculating a second position vector which is advanced or delayed from the first position vector by 90 degrees in the two-phase alternating current coordinates system;

correcting the first position vector such that an outer product of the induced voltage vector and the second position vector substantially becomes zero; and obtaining a position corresponding to the corrected first position vector as an estimated magnetic pole position currently determined.

26. The method according to claim 25, wherein the step of setting the first position vector includes:

estimating a speed of a magnetic pole; and calculating the first position vector from the estimated speed, and the step of correcting the first position vector includes:

correcting the estimated speed with the outer product such that the outer product derived from the corrected estimated speed substantially becomes zero; and calculating a corrected first position vector from the corrected estimated speed.

27. The method according to claim 26, wherein the step of calculating the corrected first position vector comprises:

integrating the corrected estimated speed to obtain a phase shifted position vector;

calculating a phase compensating value from the outer product derived from the corrected estimated speed; and calculating the corrected first position vector from both the phase shifted position vector and the phase compensating value.

28. The method according to claim 25, wherein the induced voltage vector and the second position vector are normalized in the calculation of the outer product.

29. The method according to claim 1, wherein the step of controlling the motor includes controlling a phase of the alternating current voltage applied to the motor according to the estimated magnetic pole position.

* * * * *